(12) United States Patent
Vidovic, Jr.

(10) Patent No.: US 9,518,397 B2
(45) Date of Patent: Dec. 13, 2016

(54) CARPET REMOVAL DEVICE AND METHOD OF USING THE SAME

(75) Inventor: David Allen Vidovic, Jr., Berea, OH (US)

(73) Assignee: Carpet Concepts LLC, Berea, OH (US)

( * ) Notice: Subject to any disclaimer, the term of this patent is extended or adjusted under 35 U.S.C. 154(b) by 426 days.

(21) Appl. No.: 13/307,536

(22) Filed: Nov. 30, 2011

(65) Prior Publication Data

US 2012/0234498 A1  Sep. 20, 2012

(51) Int. Cl.
*B32B 38/10* (2006.01)
*E04G 23/00* (2006.01)
*B32B 43/00* (2006.01)

(52) U.S. Cl.
CPC ............ *E04G 23/006* (2013.01); *B32B 38/10* (2013.01); *B32B 43/006* (2013.01); *Y10T 156/1168* (2015.01); *Y10T 156/1174* (2015.01); *Y10T 156/1179* (2015.01); *Y10T 156/1978* (2015.01); *Y10T 156/1983* (2015.01)

(58) Field of Classification Search
CPC .. B32B 38/10; B32B 43/006; Y10T 156/1174; Y10T 156/1179; Y10T 156/1978; Y10T 156/1983
See application file for complete search history.

(56) References Cited

U.S. PATENT DOCUMENTS

| 4,332,371 | A | | 6/1982 | Bell et al. | |
|---|---|---|---|---|---|
| 4,560,146 | A | | 12/1985 | Thomas et al. | |
| 5,456,794 | A | * | 10/1995 | Barrett | 156/763 |
| 6,004,426 | A | | 12/1999 | Johnson | |
| 6,119,375 | A | * | 9/2000 | Wilson et al. | 37/195 |
| 7,384,498 | B2 | | 6/2008 | Rannikko | |
| 7,850,249 | B2 | | 12/2010 | Manners | |
| 7,959,760 | B1 | | 6/2011 | Galbraith | |

* cited by examiner

*Primary Examiner* — Philip Tucker
*Assistant Examiner* — Nickolas Harm
(74) *Attorney, Agent, or Firm* — Curatolo Sidoti Co., LPA; Vincent A. Cortese; Salvatore A. Sidoti

(57) ABSTRACT

An apparatus for removing carpet including: a base; a hoist engaged with the base; a resilient line with first and second ends, wherein the first end is engaged with the hoist; a carpet gripping means removably engaged with the second end of the resilient line; and at least one friction surface engaged with a bottom of the base for holding the base in position. Further, a method for removing carpet comprising: the apparatus for removing carpet; moving the apparatus into position; engaging carpet to be removed with the carpet gripping means; and utilizing the hoist and resilient line to pull the carpet gripping means in order to remove the carpet.

14 Claims, 4 Drawing Sheets

CARPET REMOVAL DEVICE AND METHOD OF USING THE SAME

Carpet removal, especially removal of carpet which has been adhered to the underlying substrate with an adhesive or glue, has remained an arduous task for floor installation professionals for many years. In the past, carpeting has been removed by peeling methods used by manual labor without much, if any, mechanical assistance. In removing carpet, installation professionals may experience various injuries, including but not limited to: muscle strains, back pains, skin abrasions, bruises, arthritis, tendon and ligament damage, and flesh wounds.

Further, installation professionals are often limited to where they could work in relation to the carpet being removed. Frequently, persons removing carpet need to shift positions several times while peeling up a single section of carpet, because the person may need to be standing on a portion of the piece of carpet to be removed in order to obtain the leverage needed to peel the carpet off the underlying substrate.

The problems associated with carpet removal have been magnified further through improvements in carpet adhesion. Over time, carpet adhesives have improved in regards to adhesive strength and durability. As carpet was installed with these improved adhesives, removal of such carpet has become more difficult as the improved adhesive performed better than its earlier counterparts. This development exacerbates the previous problems associated with the carpet removal process.

Several mechanical devices have been created through the years to aid in carpet removal. Removal times have been marginally improved, but optimization has yet to be realized. While some improvements have been made, carpet installation professionals are still subjected to the injuries brought on by purely manual carpet removal methods. Further, mechanical carpet removal devices are bulky and often damage the floor substrate underlying the carpet surface. These devices may also cause damage to any structural and/or aesthetic members to which they may need to be engaged for normal operation.

What is needed is a carpet removal device and method which increases carpet removal speed, reduces injury risk, protects the underlying floor substrate, and does not damage structural and/or aesthetic members.

Figure 4:
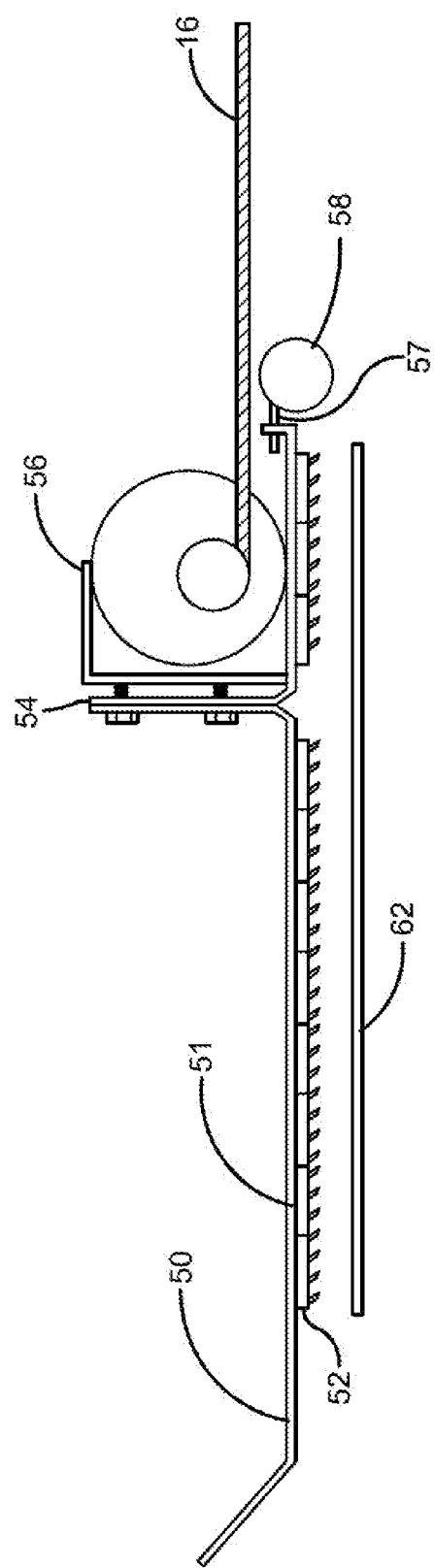
FIG. 4 is a side view of a base of an illustrative embodiment of an apparatus for removing carpet.
Figure 5:
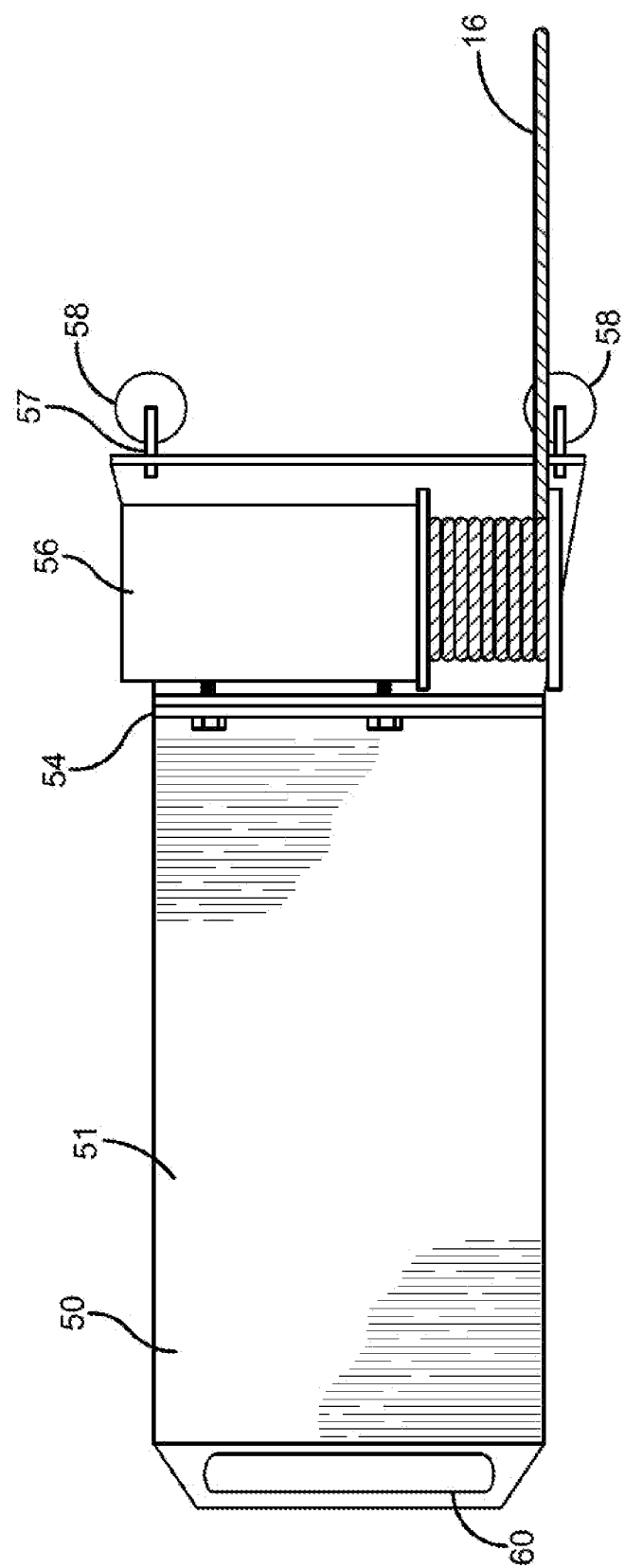

FIG. 5. is a top view of the apparatus of FIG. 4.

Provided is an apparatus and method for the safe, quick, and efficient removal of carpeting from a substrate. In one embodiment, the apparatus for removing carpet comprises: a base; a hoist engaged with the base; a resilient line with first and second ends, wherein the first end is removably engaged with the hoist; a carpet gripping means removably engaged with the second end of the resilient line; and at least one friction surface engaged with a bottom surface of the base for holding the base in position.

The base of the carpet removal apparatus provides the support structure of the apparatus. The base may be constructed from a rigid material, preventing contortion or damage to the apparatus components. In certain embodiments, the base may be manufactured from a metal, metal alloy, polymeric, composite, or wood material.

The carpet removal apparatus includes a hoist that is operatively engaged with the base. In operation, the hoist provides the pulling force necessary to remove a section of carpet from the floor substrate.

The carpet removal apparatus further includes a resilient line that is removably engaged with the hoist. The resilient line may comprise a rope, a chain, a cable, a wire, a string, a cord, or other suitable material. In certain embodiments, the resilient line has a pulling capacity greater than or equal to about 220 lbs. In certain embodiments, the resilient line has a pulling capacity greater than or equal to about 440 lbs. In certain embodiments, the resilient line has a pulling capacity greater than or equal to about 550 lbs. In certain embodiments, the resilient line has a pulling capacity greater than or equal to about 60 lbs. In certain embodiments, the resilient line has a pulling capacity greater than or equal to about 880 lbs. In certain embodiments, the resilient line has a pulling capacity greater than or equal to about 1100 lbs. In certain embodiments, the resilient line has a pulling capacity greater than or equal to about 1300 lbs. Pulling capacity indicates the maximum weight that the resilient line can safely pull without failing. The term "resilient" means that the line is: strong enough to support and suspend loads of at least 200 lbs, and capable of undergoing a winding/unwinding operation without being permanently deformed.

The carpet gripping means is removably engaged with the second end of the resilient line. The carpet gripping means provides engagement with the carpet to be removed. The means utilized to grip the carpet may include stapling; clamping; coupling; adhesive attachment; fastening via bolts, screws, and/or nails; and similar means known in the art. An end of the carpet to be removed is fixed between spaced apart surfaces of the carpet gripping means. The carpet gripping means is removably engaged with the second end of the resilient line through a hook, link, coupling, lock, or other suitable connection mechanism. Once the carpet to be removed is engaged within the carpet gripping means, and the carpet gripping means is engaged with the second end of the resilient line, before or after the carpet to be removed is engaged within the carpet gripping means, the hoist may be activated to pull carpet to be removed off of a floor substrate.

The at least one friction surface engaged with the bottom surface of the base holds the base in position during carpet removal, and may comprise any structure which allows the base to be held in position during carpet removal. The at least one friction surface may be incorporated into the bottom surface of the base, or may be a separate piece engaged with the bottom surface of the base. The friction surface may comprise a metal, metal alloy, polymeric, composite, or wood material with projections extending outwardly from the bottom surface of the base. The projections of the friction surface serve to grab or hold the underlying carpet such that the base is held in position during operation of the carpet removal apparatus.

The projections may be incorporated onto the surface of the base itself, or may be provided on a separate element which is attached to the bottom of the base. In certain embodiments, the friction surface may be at least one tack strip engaged with the bottom surface of the base. In other embodiments, the friction surface may be provided by altering the bottom surface of the base in order to provide at least one projection on the bottom surface of the base, wherein the at least one projection is capable of holding the base in position during carpet removal. For example, the base may be made of a metal material, and the metal material may be punched or stamped such that sharp metal points are created on the bottom surface of the base.

In certain embodiments, the base comprises a base plate, a handle portion, and a hoist mount. The base plate may provide structural stabilization to the apparatus. The handle portion may be a unitary part of the base plate, or may be engaged with the base plate to allow the base to be easily moved. The hoist mount may be a unitary part of the base plate, or may be engaged with the base plate to serve as a mounting location at which a hoist may be engaged.

In certain embodiments, the hoist mount is oriented substantially perpendicular to the base plate. In orienting the hoist mount substantially perpendicular to the base plate, adequate space is available on both sides of the hoist mount to engage a hoist on one side, and other components such as a handle portion, on the opposite side.

In certain embodiments, the hoist has a pulling line speed of greater than or equal to about 15 feet per minute. Pulling line speed is an industry term for measuring the speed at which the resilient line may be retracted by the hoist when pulling carpet off of a target floor substrate. Previous carpet removal devices typically use winches which have a pulling line speed significantly less than 15 feet per minute. By utilizing a hoist instead of a winch, pulling line speed may be equal to or greater than about 15 feet per minute, resulting in faster carpet removal. In certain embodiments, the hoist has a pulling line speed of greater than or equal to about 20 feet per minute. In certain embodiments, the hoist has a pulling line speed of greater than or equal to about 25 feet per minute. In certain embodiments, the hoist has a pulling line speed of greater than or equal to about 30 feet per minute. In certain embodiments, the hoist has a pulling line speed of greater than or equal to about 33 feet per minute.

In certain embodiments, the carpet gripping means comprises a top plate, a bottom plate, at least one tack strip, and at least one nut and bolt assembly. The top plate has an exterior surface, and an interior surface optionally covered with a tack strip. The bottom plate has an exterior surface and an interior surface optionally covered with a tack strip. Further, at least one nut and bolt assembly may be utilized to engage the top plate with bottom plate.

In certain embodiments, the top plate comprises a top pull plate which acts to engage and pull the carpet to be removed, and the bottom plate comprises a bottom restrictor plate which acts to restrict the carpet to be removed from disengaging from the top pull plate. According to these embodiments, the top pull plate includes a tack strip for engaging and pulling the carpet to be removed, while the bottom restrictor plate restricts the carpet to be removed form disengaging from the tack strip on the top pull plate.

In certain embodiments, carpeting being removed contacts the at least one tack strip in between the top pull plate and bottom restrictor plate. By installing a tack strip on the interior surface of the top pull plate or the interior surface of the bottom restrictor plate, the tack strip grabs and holds an end of the carpeting to be removed.

In certain embodiments, the interior surface of the bottom restrictor plate may comprise a cushion mat. According to these embodiments, the at least one tack strip may be engaged with the interior surface of the top pull plate, and the tack strip may pass through the carpeting to be removed and be held by the cushion mat. The cushion mat may therefore act to provide increased gripping strength to the carpet gripping means. The cushion mat may comprise any material which is capable of providing the described result, such as, but not limited to, a polymeric and/or rubber mat.

In certain embodiments, the top pull plate and bottom restrictor plate may be manufactured from a metal, metal alloy, polymeric, composite, or wood material.

In certain embodiments, the bolt of the at least one nut and bolt assembly passes through the carpet being removed and the top pull plate, wherein the nut of the nut and bolt assembly engages with the bolt on the surface of the top pull plate opposite the bottom restrictor plate. The at least one nut and bolt assembly is engaged with the bottom restrictor plate such that the bolt is oriented through the bottom restrictor plate and passing through the interior surface. The top pull plate is adapted with an opening through the pull plate, extending from the interior surface, to the flat exterior surface. The bolt communicates through the opening in the top pull plate, with a portion of the bolt visibly exposed on the flat exterior surface of the top pull plate. The portion of the bolt which is visibly exposed on the flat exterior surface of the top pull plate serves as a receiving point for the nut portion of the nut and bolt assembly. The nut portion is engaged and received on the visible bolt portion on the flat exterior surface of the top pull plate. After the nut is engaged and received on the visible bolt portion, the carpet gripping device is in a clamped or closed position.

The bolt from the nut and bolt assembly may also engage the carpet to be removed. The bolt may be forced through a hole or other opening in the carpet, or may create a hole in the carpet by being forced through the carpet. The carpet to be removed may therefore be engaged with both the at least one tack strip and the bolt of the nut and bolt assembly.

Engagement with the bolt has the added benefit of creating another grabbing/holding location between the carpet gripping means and the carpet to be removed. According to these embodiments, it becomes less likely that the carpet to be removed will slip out of or escape the carpet gripping device.

In certain embodiments, the apparatus further comprises a polymeric mat for engaging the apparatus with a hard surface. By engaging a polymeric mat on the base of the apparatus, the apparatus may be positioned on a non-carpeted surface. As the apparatus may be positioned on a non-carpeted surface, it may pull up an entire section of carpet as opposed to only a portion of the section of carpet. By pulling up an entire section of carpet, removal time may be reduced.

In certain embodiments, the base comprises at least one handle portion. The at least one handle portion allows easy gripping of the apparatus, and aids in transporting or moving the apparatus from one position to another when the apparatus is not being operated.

In certain embodiments, the base comprises at least one wheel mount. In certain embodiments, the base comprises at least one wheel mounted on the at least one wheel mount. The at least one wheel mount allows at least one wheel to be attached to the apparatus. By attaching at least one wheel, transportation of the apparatus may be made easier. In certain embodiments, the base comprises two wheel mounts and two wheels.

Also provided is a method for removing carpet. The method for removing carpet comprises an apparatus comprising: a base, a hoist engaged with the base; a resilient line with first and second ends, wherein the first end is engaged with the hoist; a carpet gripping means removably engaged with the second end of the resilient line; at least one friction surface engaged with a bottom of the base for holding the base in position; moving the apparatus into position; engaging the carpet to be removed with the carpet gripping means; and utilizing the mechanical hoist and resilient line to pull the carpet gripping means in order to remove the carpet. Once the apparatus is placed in position, an end of the carpet to be removed may be engaged with the carpet gripping means. The hoist may then be activated, and the resilient cable pulls the carpet gripping means closer to the hoist. As the carpet gripping means approaches the hoist, the carpet to be removed is pulled off a floor substrate, and is removed in a quick, effective, and safe manner.

The subject apparatus will now be described in greater detail with reference to the FIGURES. It should be noted that the subject apparatus is not intended to be limited to the illustrative embodiments shown in the FIGURES.

Figure 1:
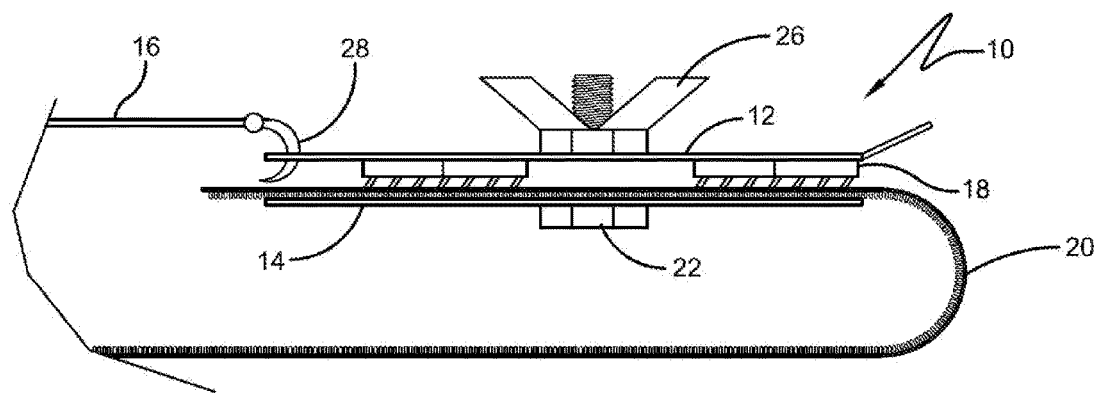
FIG. 1 is a side view of an illustrative embodiment of an assembled and engaged carpet gripping means.
Figure 2:
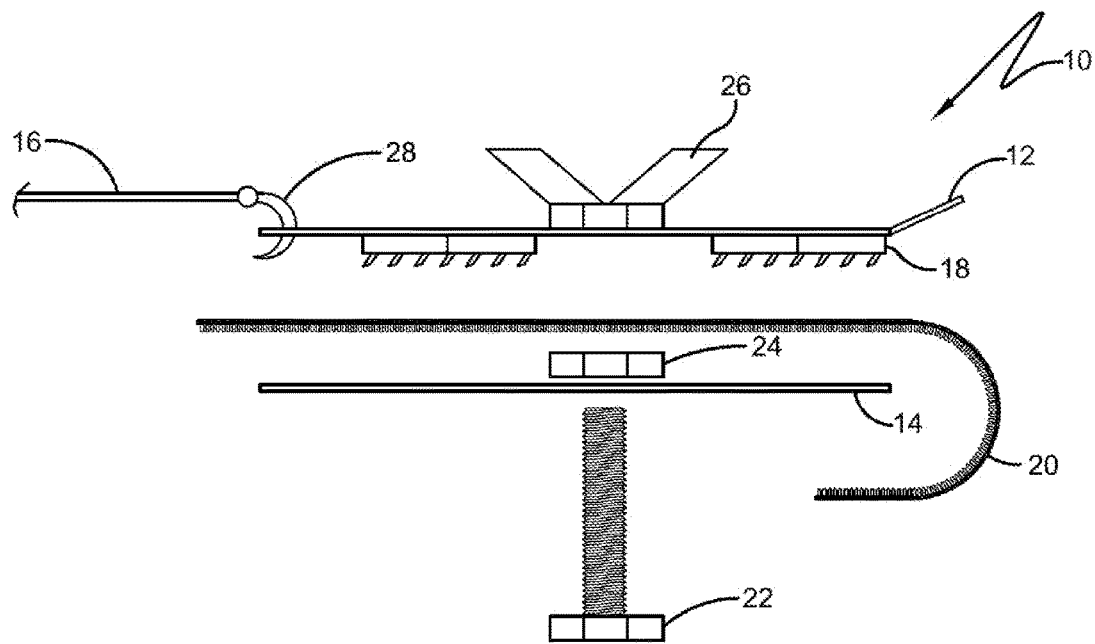
FIG. 2 is an exploded view of the carpet gripping means of FIG. 1.
Figure 3:
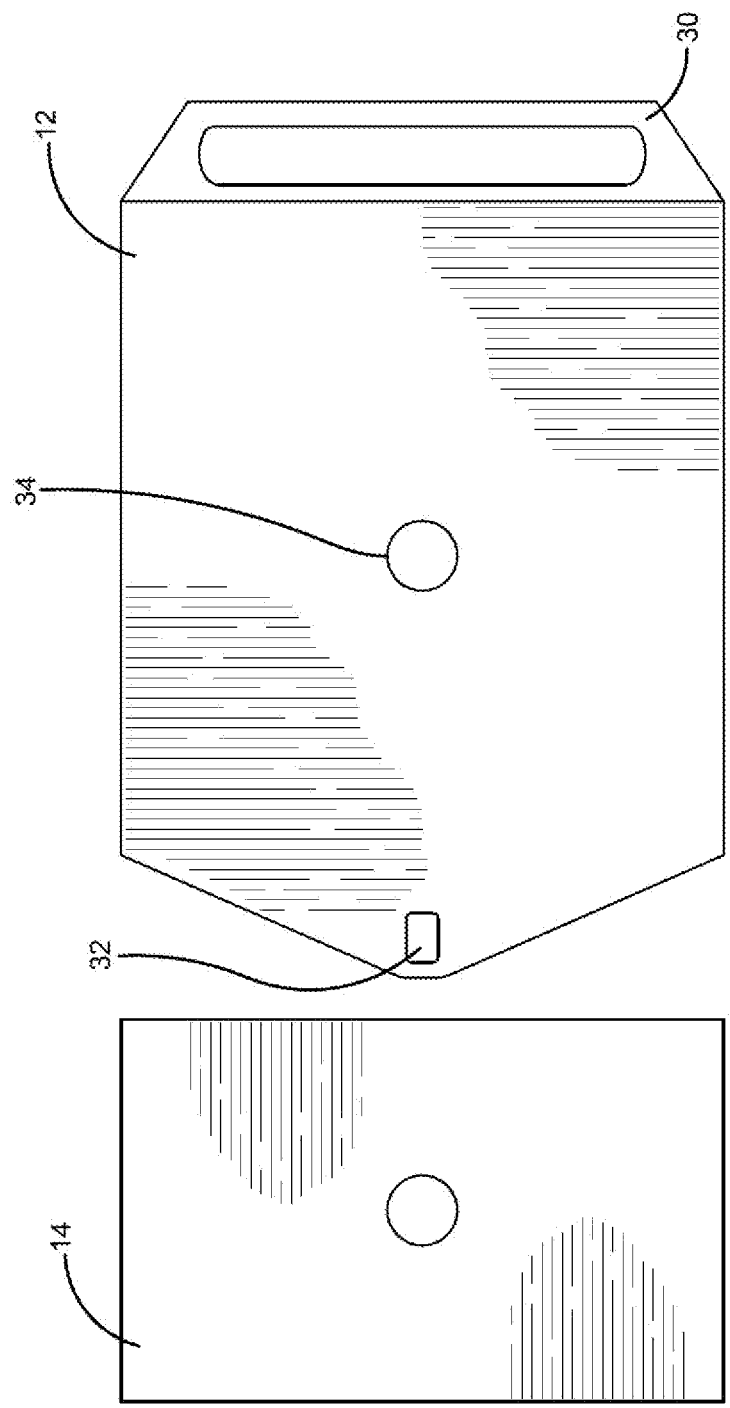
FIG. 3 is a schematic view of components of the carpet gripping means of FIG. 1.

Referring to FIG. 1, FIG. 2, and FIG. 3, an embodiment of the subject apparatus comprises a carpet gripping means 10 engaged with a resilient line 16. The carpet gripping means 10 engages the resilient line 16 via a hook 28. The hook engages the carpet gripping means 10 through an aperture 32 in a top pull plate 12.

The carpet gripping means 10 comprises the top pull plate 12, a bottom restrictor plate 14, a bolt 22, spacer 24, nut 26, and tack strip 18 for gripping carpet 20. A portion of the carpet 20 to be removed is oriented between top pull plate 12 and bottom restrictor plate 14, and the carpet 20 is engaged with the tack strip 18. The bolt 22 and spacer 24 engage the bottom restrictor plate 14 through an aperture 34. After engaging the bottom restrictor plate 14, the bolt 22 and spacer 24 engage the carpet to be removed by creating an aperture in the carpet 20. Once engaged with the bottom restrictor plate 14 and carpet 20, the bolt 22 engages the top pull plate 12 through another aperture 34, and becomes visible on the exterior surface of the top pull plate 12. The visible portion of the bolt 22 then engages a nut 26 to fix the top pull plate 12, bottom restrictor plate 14, and carpet 20 with the carpet gripping means 10. In certain embodiments, the spacer 24 may be a washer.

The top pull plate of the apparatus may further comprise a handle 30.

Referring to FIG. 4 and FIG. 5, the apparatus further comprises a base 50, a hoist 56, and the resilient line 16. The base 50 further comprises a base plate 51, a hoist mount 54, and a handle portion 60. The base 50 may further comprise a tack strip 52 to be engaged with a carpeted floor. The base 50 may further comprise a wheel mount 57 and a wheel 58. In certain embodiments, a mat 62 may be provided underneath the base in order to engage the base with a hard-surface floor or flooring substrate.

While the apparatus and method have been described in connection with various illustrative embodiments, it is to be understood that other similar embodiments may be used or modifications and additions may be made to the described embodiments for performing the same function disclosed herein without deviating therefrom. The embodiments described above are not necessarily in the alternative, as various embodiments may be combined to provide the desired characteristics. Therefore, the apparatus and method should not be limited to any single embodiment, but rather construed in breadth and scope in accordance with the recitation of the appended claims.

I claim:

1. An apparatus for removing carpet comprising:
   a base;
   a hoist engaged with the base;
   a resilient line with first and second ends, wherein the first end is removably engaged with the hoist;
   a carpet gripping means removably engaged with the second end of the resilient line; and
   at least one friction surface engaged with a bottom surface of the base for holding the base in position;
   wherein the carpet gripping means comprises a top pull plate, a bottom restrictor plate, at least one tack strip, and at least one nut and bolt assembly;
   wherein the top pull plate and bottom restrictor plate are removably engaged with each other via the at least one nut and bolt assembly;
   wherein the bolt of the at least one nut and bolt assembly passes through the bottom restrictor plate, the carpet being removed and the top pull plate; and
   wherein the nut of the nut and bolt assembly engages with the bolt on the surface of the top pull plate opposite the bottom restrictor plate.

2. The carpet gripping device of claim 1, wherein the top pull plate and/or the bottom restrictor plate comprise a metal, metal alloy, polymeric, composite, or wood material.

3. The carpet gripping device of claim 1, wherein the carpet gripping means comprises a space between the top pull plate and the bottom restrictor plate to engage carpet with the at least one tack strip.

4. The carpet gripping device of claim 1, wherein the top pull plate comprises a tack strip engaged with an interior surface of the top pull plate.

5. The carpet gripping device of claim 4, wherein the bottom restrictor plate further comprises a cushion mat engaged with the interior surface of the bottom restrictor plate.

6. The apparatus of claim 1, further comprising a polymeric mat for engaging the apparatus with a hard surface.

7. The apparatus of claim 1, wherein the base comprises at least one handle portion.

8. The apparatus of claim 1, wherein the base comprises at least one wheel mount.

9. The apparatus of claim 1, wherein the base comprises at least one wheel.

10. The apparatus of claim 1, wherein a pulling line speed of the hoist is greater than or equal to about 15 feet per minute.

11. The apparatus of claim 1, wherein a pulling line speed of the hoist is greater than or equal to about 33 feet per minute.

12. The apparatus of claim 1, wherein the base comprises a base plate, a handle portion, and a hoist mount.

13. The apparatus of claim 12, wherein the hoist mount is oriented substantially perpendicular to the base plate.

14. The apparatus of claim 1, wherein the base comprises a metal, metal alloy, polymeric, composite, or wood material.

* * * * *